United States Patent
Kuo

(10) Patent No.: US 9,992,693 B2
(45) Date of Patent: Jun. 5, 2018

(54) METHOD AND APPARATUS FOR ADDING SERVING CELLS IN A WIRELESS COMMUNICATION SYSTEM

(71) Applicant: INNOVATIVE SONIC CORPORATION, Taipei (TW)

(72) Inventor: Richard Lee-Chee Kuo, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 150 days.

(21) Appl. No.: 14/224,713

(22) Filed: Mar. 25, 2014

(65) Prior Publication Data

US 2014/0293897 A1 Oct. 2, 2014

Related U.S. Application Data

(60) Provisional application No. 61/807,103, filed on Apr. 1, 2013.

(51) Int. Cl.
*H04W 24/04* (2009.01)
*H04W 72/04* (2009.01)
(Continued)

(52) U.S. Cl.
CPC .......... *H04W 24/04* (2013.01); *H04W 24/02* (2013.01); *H04W 72/04* (2013.01);
(Continued)

(58) Field of Classification Search
None
See application file for complete search history.

(56) References Cited

U.S. PATENT DOCUMENTS

2009/0104890 A1* 4/2009 Wang ................. H04W 12/02 455/410
2009/0175175 A1* 7/2009 Somasundaram .... H04L 1/1838 370/242

(Continued)

FOREIGN PATENT DOCUMENTS

EP 1915017 A2 4/2008
EP 2309817 A1 8/2010
(Continued)

OTHER PUBLICATIONS

3GPP TSG-RAN WG2 Meeting #81, Jan. 28 to Feb. 1, 2013, St. Julian's, Malta (R2-130614).
(Continued)

*Primary Examiner* — Christopher Crutchfield
*Assistant Examiner* — Tito Pham
(74) *Attorney, Agent, or Firm* — Blue Capital Law Firm, P.C.

(57) ABSTRACT

A method and apparatus are disclosed for adding serving cells in a wireless communication system. The method includes a UE (User Equipment) is served by a first cell controlled by a first eNB (evolved Node B), wherein multiple radio bearers (RBs) for the UE are allocated to the first eNB and there is a MAC (Medium Access Control) entity in the UE for supporting the first cell. The method also includes the UE receives a RRC (Radio Resource Control) message for adding a second cell controlled by a second eNB to the UE, wherein a RB among the multiple RBs is relocated to the second eNB according to information included in the RRC message. The method further includes the UE re-establishes a RLC (Radio Link Control) entity corresponding to the RB and does not reset the MAC entity in response to the relocation of the RB.

12 Claims, 9 Drawing Sheets

(51) Int. Cl.
*H04W 76/04* (2009.01)
*H04W 76/06* (2009.01)
*H04W 24/02* (2009.01)
*H04W 84/04* (2009.01)
*H04W 36/00* (2009.01)

(52) U.S. Cl.
CPC ....... *H04W 76/045* (2013.01); *H04W 76/064* (2013.01); *H04W 36/00* (2013.01); *H04W 84/045* (2013.01)

(56) References Cited

U.S. PATENT DOCUMENTS

| | | | |
|---|---|---|---|
| 2009/0190554 A1* | 7/2009 | Cho | H04L 1/1874 370/331 |
| 2009/0316664 A1* | 12/2009 | Wu | H04W 76/028 370/336 |
| 2010/0184438 A1* | 7/2010 | Wu | H04W 36/0055 455/436 |
| 2011/0130099 A1 | 6/2011 | Madan et al. | |
| 2011/0321050 A1 | 12/2011 | Ho et al. | |
| 2012/0281548 A1* | 11/2012 | Lin | H04W 36/30 370/242 |
| 2013/0016696 A1* | 1/2013 | Adjakple | H04W 76/025 370/331 |
| 2013/0077507 A1 | 3/2013 | Yu et al. | |
| 2013/0170474 A1* | 7/2013 | Bi | H04W 36/0055 370/332 |
| 2013/0215772 A1* | 8/2013 | Kaur | H04W 36/0072 370/252 |
| 2014/0010207 A1* | 1/2014 | Horn | H04W 36/165 370/332 |
| 2014/0198734 A1* | 7/2014 | Yamada | H04W 72/04 370/329 |
| 2014/0204771 A1* | 7/2014 | Gao | H04W 36/28 370/252 |
| 2015/0055621 A1* | 2/2015 | Koskinen | H04W 36/18 370/331 |
| 2015/0063091 A1* | 3/2015 | Vesterinen | H04W 76/028 370/216 |
| 2015/0117287 A1* | 4/2015 | Kim | H04W 52/0216 370/311 |

FOREIGN PATENT DOCUMENTS

| | | |
|---|---|---|
| EP | 2302968 A2 | 3/2011 |
| JP | 2014-187651 | 2/2014 |
| JP | 2014-158238 A | 8/2014 |
| WO | 2010017376 A1 | 2/2010 |
| WO | 2011082110 A1 | 7/2011 |
| WO | 2012019362 A1 | 2/2012 |
| WO | 2012130055 A1 | 10/2012 |
| WO | 2012136269 A1 | 10/2012 |
| WO | 2013010418 A1 | 1/2013 |
| WO | 2013023681 A1 | 2/2013 |
| WO | 2013023959 A1 | 2/2013 |

OTHER PUBLICATIONS

Office Action on corresponding JP Patent Application No. 2014-067351 dated Feb. 24, 2015.
3GPP TSG-RAN WG2#79 Qingdao, China, Aug. 13-17, 2012, Tdoc R2-124071.
Office Action on corresponding TW Patent Application No. 103111917 dated Apr. 30, 2015.
Office Action on corresponding JP Patent Application No. 2014-067350 dated Mar. 31, 2015.
3GPP TSG-RAN WG2 #81 Malta. Jan. 28-Feb. 1, 2013 (R2-130420).
3GPP TSG-RAN WG2 Meeting #81 St. Julian's, Malta, Jan. 28-Feb. 1, 2013 (R2-130228).
3GPP TSG-RAN WG2 Meeting #81 St. Julian's, Malta, Jan. 28-Feb. 1, 2013 (R2-130570).
3GPP TSG-RAN WG2 Meeting #82 Fukuoka, Japan, May 20-24, 2013 (R2-131964).
3GPP TSG-RAN WG2 Meeting #83bis Ljubljana, Slovenia, Oct. 7-11, 2013 (R2-133496).
3GPP TSG-RAN WG2 Meeting #84 San Francisco, USA, Nov. 11-15, 2013 (R2-133855).
Search Report on corresponding EP Patent Application No. 14159315.2 dated Nov. 6, 2014.
Search Report on corresponding EP Patent Application No. 14159317.8 dated Nov. 24, 2014.
Search Report on corresponding EP Patent Application No. 14162735.6 dated Oct. 13, 2014.
Search Report on corresponding EP Patent Application No. 14162778.6 dated Oct. 13, 2014.
3GPP TS 36.323 V11.2.0 (Mar. 2013).
Search Report on corresponding EP Patent Application No. 14161761.3 dated Dec. 4, 2014.
Search Report on corresponding EP Patent Application No. 14162304.1 dated Dec. 9, 2014.
Office Action on corresponding TW Patent Application No. 103111394 dated Dec. 15, 2015.

* cited by examiner

METHOD AND APPARATUS FOR ADDING SERVING CELLS IN A WIRELESS COMMUNICATION SYSTEM

CROSS-REFERENCE TO RELATED APPLICATIONS

The present application claims the benefit of U.S. Provisional Patent Application Ser. No. 61/807,103 filed on Apr. 1, 2013, the entire disclosure of which is incorporated herein by reference.

FIELD

This disclosure generally relates to wireless communication networks, and more particularly, to a method and apparatus for adding serving cells in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed for adding serving cells in a wireless communication system. The method includes a UE (User Equipment) is served by a first cell controlled by a first eNB (evolved Node B), wherein multiple radio bearers (RBs) for the UE are allocated to the first eNB and there is a MAC (Medium Access Control) entity in the UE for supporting the first cell. The method also includes the UE receives a RRC (Radio Resource Control) message for adding a second cell controlled by a second eNB to the UE, wherein a RB among the multiple RBs is relocated to the second eNB according to information included in the RRC message. The method further includes the UE re-establishes a RLC (Radio Link Control) entity corresponding to the RB and does not reset the MAC entity in response to the relocation of the RB.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. 3GPP TR36.392 v12.0.0 (2012-12), "Scenarios and Requirements for Small Cell Enhancements for E-UTRA and E-UTRAN"; RP-122033, "New Study Item Description: Small Cell enhancements for E-UTRA and E-UTRAN—Higher-layer aspects"; TS 36.300 V11.4.0 (2012-12), "E-UTRAN; Overall description; Stage 2"; TS 36.331 V11.3.0 (2013-03), "E-UTRA; RRC protocol specification"; R2-130420, "Protocol architecture alternatives for dual connectivity"; and R2-130570, "Scenarios and benefits of dual connectivity". The standards and documents listed above are hereby expressly incorporated herein.

Figure 1:
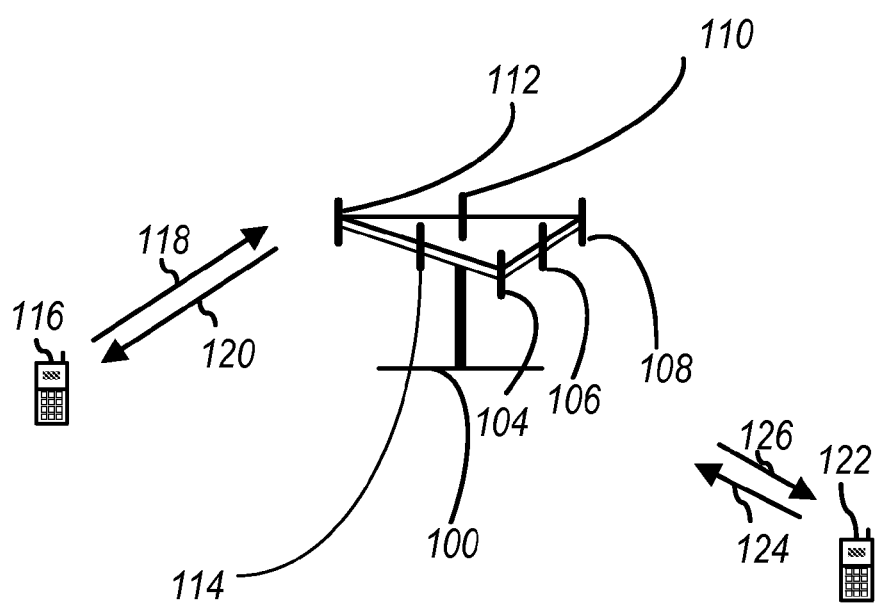
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
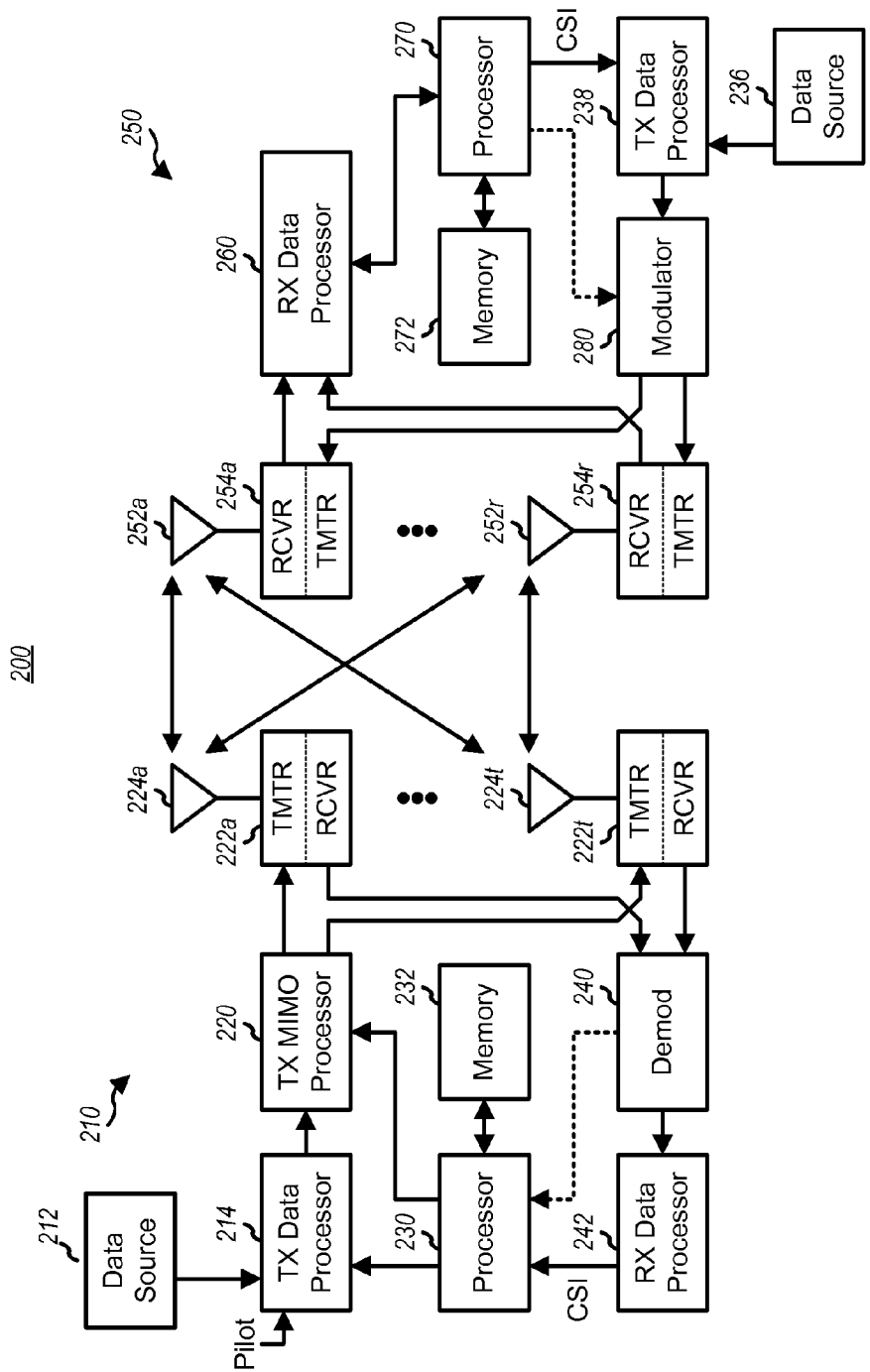
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
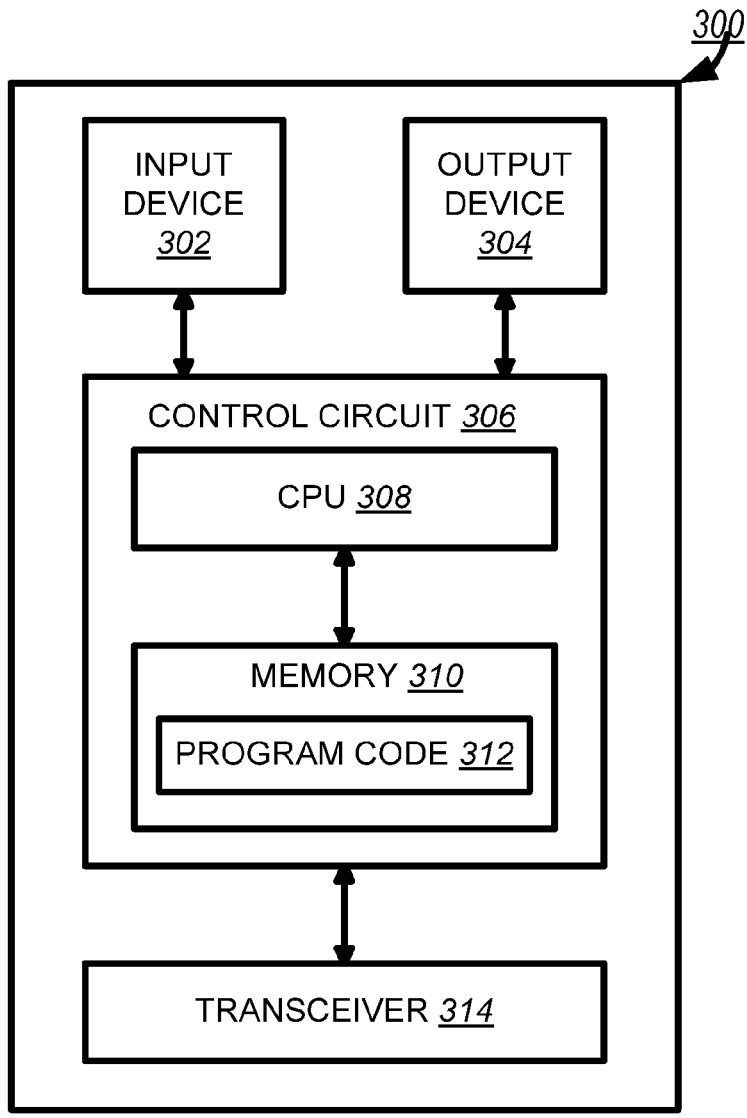
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
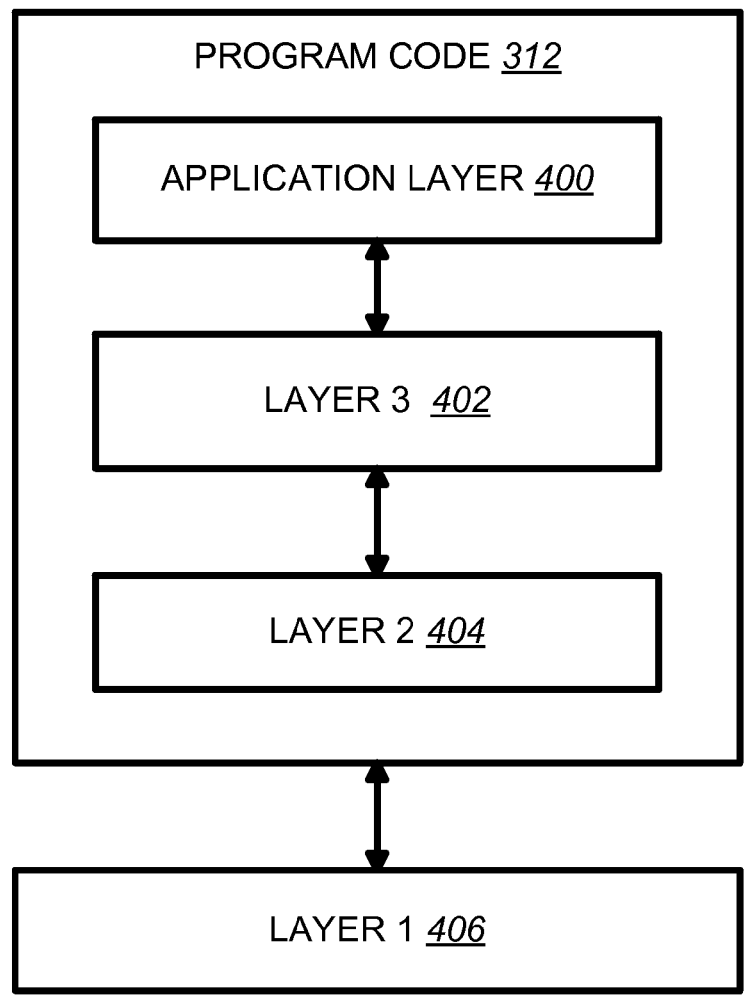
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TR 36.392 v12.0.0 states:
Small cells using low power nodes are considered promising to cope with mobile traffic explosion, especially for hotspot deployments in indoor and outdoor scenarios. A low-power node generally means a node whose Tx power is lower than macro node and BS classes, for example Pico and Femto eNB are both applicable. Small cell enhancements for E-UTRA and E-UTRAN will focus on additional functionalities for enhanced performance in hotspot areas for indoor and outdoor using low power nodes.

This document captures the scenarios and requirements for small cell enhancements. 3GPP TR 36.913 [3] should be used as reference whenever applicable in order to avoid duplication of the requirements.

In addition, 3GPP RP-122033 states:

4 Objective*

The objective of this study is to identify potential technologies in the protocol and architecture for enhanced support of small cell deployment and operation which should satisfy scenarios and requirements defined in TR 36.932.

The study shall be conducted on the following aspects:
  Identify and evaluate the benefits of UEs having dual connectivity to macro and small cell layers served by different or same carrier and for which scenarios such dual connectivity is feasible and beneficial.
  Identify and evaluate potential architecture and protocol enhancements for the scenarios in TR 36.932 and in particular for the feasible scenario of dual connectivity and minimize core network impacts if feasible, including:
    Overall structure of control and user plane and their relation to each other, e.g., supporting C-plane and U-plane in different nodes, termination of different protocol layers, etc.
  Identify and evaluate the necessity of overall Radio Resource Management structure and mobility enhancements for small cell deployments:
    Mobility mechanisms for minimizing inter-node UE context transfer and signalling towards the core network.
    Measurement and cell identification enhancements while minimizing increased UE battery consumption.

For each potential enhancement, the gain, complexity and specification impact should be assessed.

The study shall focus on potential enhancements which are not covered by other SI/WIs.

Furthermore, 3GPP TS 36.300 V11.4.0 provides the following the description regarding Carrier Aggregation (CA):

5.5 Carrier Aggregation

In Carrier Aggregation (CA), two or more Component Carriers (CCs) are aggregated in order to support wider transmission bandwidths up to 100 MHz. A UE may simultaneously receive or transmit on one or multiple CCs depending on its capabilities:
  A UE with single timing advance capability for CA can simultaneously receive and/or transmit on multiple CCs corresponding to multiple serving cells sharing the same timing advance (multiple serving cells grouped in one TAG);
  A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell;
  A non-CA capable UE can receive on a single CC and transmit on a single CC corresponding to one serving cell only (one serving cell in one TAG).

CA is supported for both contiguous and non-contiguous CCs with each CC limited to a maximum of 110 Resource Blocks in the frequency domain using the Rel-8/9 numerology.

It is possible to configure a UE to aggregate a different number of CCs originating from the same eNB and of possibly different bandwidths in the UL and the DL:
  The number of DL CCs that can be configured depends on the DL aggregation capability of the UE;
  The number of UL CCs that can be configured depends on the UL aggregation capability of the UE;
  It is not possible to configure a UE with more UL CCs than DL CCs;
  In typical TDD deployments, the number of CCs and the bandwidth of each CC in UL and DL is the same.
  The number of TAGs that can be configured depends on the TAG capability of the UE.

CCs originating from the same eNB need not to provide the same coverage.

CCs shall be LTE Rel-8/9 compatible. Nevertheless, existing mechanisms (e.g. barring) may be used to avoid Rel-8/9 UEs to camp on a CC.

The spacing between centre frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

[ . . . ]

7.5 Carrier Aggregation

When CA is configured, the UE only has one RRC connection with the network. At RRC connection establishment/re-establishment/handover, one serving cell provides the NAS mobility information (e.g. TAI), and at RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The configured set of serving cells for a UE therefore always consists of one PCell and one or more SCells:
  For each SCell the usage of uplink resources by the UE in addition to the downlink ones is configurable (the number of DL SCCs configured is therefore always larger than or equal to the number of UL SCCs and no SCell can be configured for usage of uplink resources only);
  From a UE viewpoint, each uplink resource only belongs to one serving cell;
  The number of serving cells that can be configured depends on the aggregation capability of the UE (see subclause 5.5);
  PCell can only be changed with handover procedure (i.e. with security key change and RACH procedure);
  PCell is used for transmission of PUCCH;
  Unlike SCells, PCell cannot be de-activated (see subclause 11.2);

Re-establishment is triggered when PCell experiences RLF, not when SCells experience RLF;

NAS information is taken from PCell.

The reconfiguration, addition and removal of SCells can be performed by RRC. At intra-LTE handover, RRC can also add, remove, or reconfigure SCells for usage with the target PCell. When adding a new SCell, dedicated RRC signalling is used for sending all required system information of the SCell i.e. while in connected mode, UEs need not acquire broadcasted system information directly from the SCells.

Also, 3GPP TS 36.331 V11.3.0 provides the following description:

5.3.5.4 Reception of an RRCConnectionReconfiguration Including the mobilityControlInfo by the UE (Handover)

Figure 5:
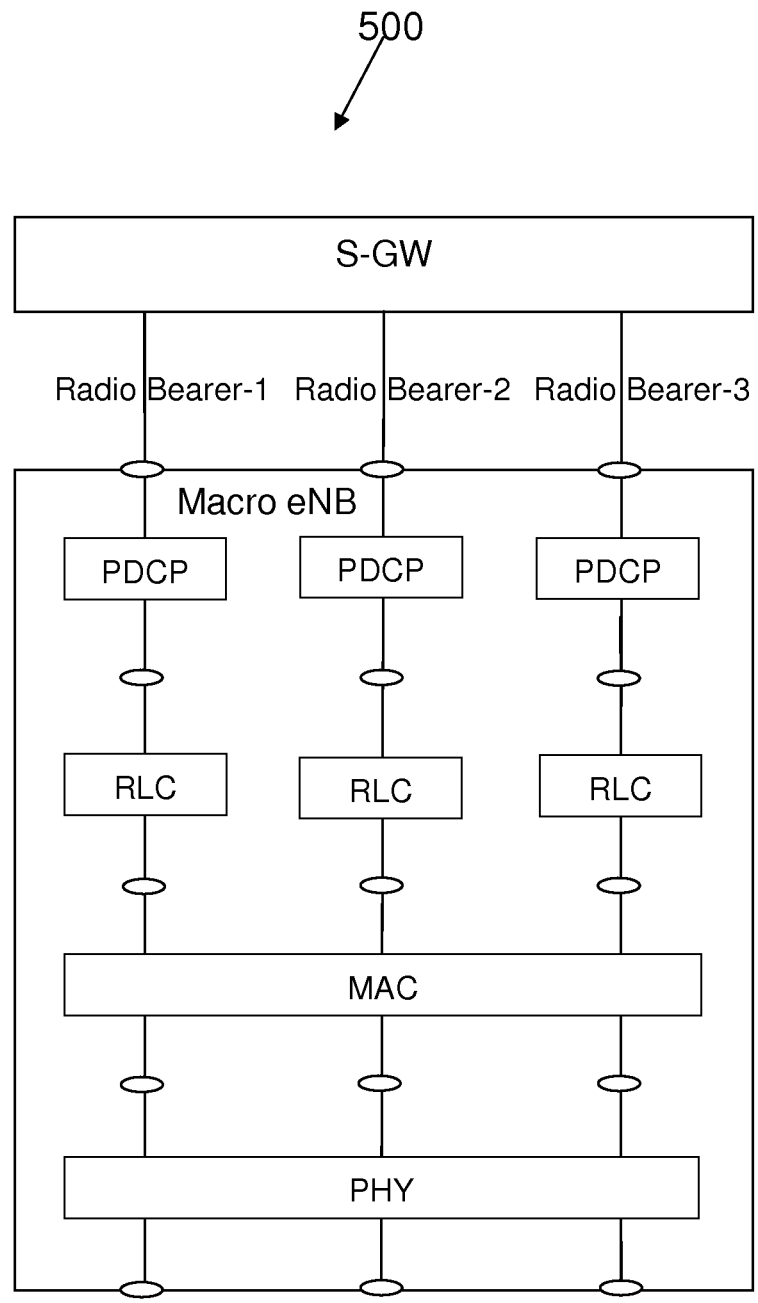
FIG. 5 illustrates a prior art protocol architecture before small cell addition according to one exemplary embodiment.
Figure 6:
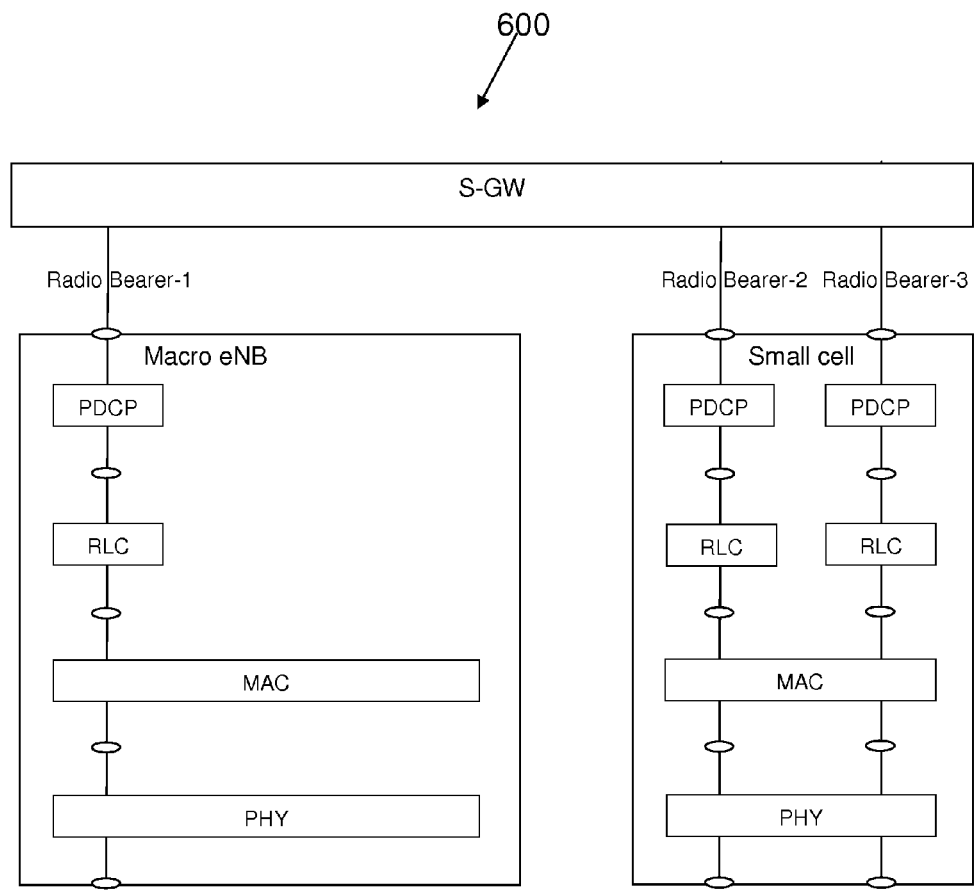
FIG. 6 illustrates a prior art protocol architecture after small cell addition according to one exemplary embodiment.

If the RRCConnectionReconfiguration message includes the mobilityControlInfo and the UE is able to comply with the configuration included in this message, the UE shall:

1> stop timer T310, if running;
1> start timer T304 with the timer value set to t304, as included in the mobilityControlInfo;
1> if the carrierFreq is included:
  2> consider the target PCell to be one on the frequency indicated by the carrierFreq with a physical cell identity indicated by the targetPhysCellId;
1> else:
  2> consider the target PCell to be one on the frequency of the source PCell with a physical cell identity indicated by the targetPhysCellId;
1> start synchronising to the DL of the target PCell;
NOTE 1: The UE should perform the handover as soon as possible following the reception of the RRC message triggering the handover, which could be before confirming successful reception (HARQ and ARQ) of this message.
1> reset MAC;
1> re-establish PDCP for all RBs that are established;
NOTE 2: The handling of the radio bearers after the successful completion of the PDCP re-establishment, e.g. the re-transmission of unacknowledged PDCP SDUs (as well as the associated status reporting), the handling of the SN and the HFN, is specified in TS 36.323 [8].
1> re-establish RLC for all RBs that are established;
1> configure lower layers to consider the SCell(s), if configured, to be in deactivated state;
1> apply the value of the newUE-Identity as the C-RNTI;
1> if the RRCConnectionReconfiguration message includes the fullConfig:
  2> perform the radio configuration procedure as specified in section 5.3.5.8;
1> configure lower layers in accordance with the received radioResourceConfigCommon;
1> configure lower layers in accordance with any additional fields, not covered in the previous, if included in the received mobilityControlInfo;
1> if the RRCConnectionReconfiguration message includes the radioResourceConfigDedicated:
  2> perform the radio resource configuration procedure as specified in 5.3.10;
1> if the keyChangeIndicator received in the securityConfigHO is set to TRUE:
  2> update the $K_{eNB}$ key based on the fresh $K_{ASME}$ key taken into use with the previous successful NAS SMC procedure, as specified in TS 33.401 [32];
1> else:
  2> update the $K_{eNB}$ key based on the current $K_{eNB}$ or the NH, using the nextHopChainingCount value indicated in the securityConfigHO, as specified in TS 33.401 [32];
1> store the nextHopChainingCount value;
1> if the securityAlgorithmConfig is included in the securityConfigHO:
  2> derive the $K_{RRCint}$ key associated with the integrityProtAlgorithm, as specified in TS 33.401 [32];
  2> if connected as an RN:
    3> derive the $K_{UPint}$ key associated with the integrityProtAlgorithm, as specified in TS 33.401 [32];
  2> derive the $K_{RRCenc}$ key and the $K_{UPenc}$ key associated with the cipheringAlgorithm, as specified in TS 33.401 [32];
1> else:
  2> derive the $K_{RRCint}$ key associated with the current integrity algorithm, as specified in TS 33.401 [32];
  2> if connected as an RN:
    3> derive the $K_{UPint}$ key associated with the current integrity algorithm, as specified in TS 33.401 [32];
  2> derive the $K_{RRCenc}$ key and the $K_{UPenc}$ key associated with the current ciphering algorithm, as specified in TS 33.401 [32];
1> configure lower layers to apply the integrity protection algorithm and the $K_{RRCint}$ key, i.e. the integrity protection configuration shall be applied to all subsequent messages received and sent by the UE, including the message used to indicate the successful completion of the procedure;
1> configure lower layers to apply the ciphering algorithm, the $K_{RRCenc}$ key and the $K_{UPenc}$ key, i.e. the ciphering configuration shall be applied to all subsequent messages received and sent by the UE, including the message used to indicate the successful completion of the procedure;
1> if connected as an RN:
  2> configure lower layers to apply the integrity protection algorithm and the $K_{UPint}$ key, for current or subsequently established DRBs that are configured to apply integrity protection, if any;
1> if the received RRCConnectionReconfiguration includes the sCellToReleaseList:
  2> perform SCell release as specified in 5.3.10.3a;
1> if the received RRCConnectionReconfiguration includes the sCellToAddModList:
  2> perform SCell addition or modification as specified in 5.3.10.3b;
1> if the received RRCConnectionReconfiguration includes the systemInformationBlockType1Dedicated:
  2> perform the actions upon reception of the SystemInformationBlockType1 message as specified in 5.2.2.7;
1> perform the measurement related actions as specified in 5.5.6.1;
1> if the RRCConnectionReconfiguration message includes the measConfig:
  2> perform the measurement configuration procedure as specified in 5.5.2;
1> perform the measurement identity autonomous removal as specified in 5.5.2.2a;
1> release reportProximityConfig and clear any associated proximity status reporting timer;
1> if the RRCConnectionReconfiguration message includes the otherConfig:
  2> perform the other configuration procedure as specified in 5.3.10.9;

1> set the content of RRCConnectionReconfiguration-
Complete message as follows:
2> if the UE has radio link failure or handover failure
information available in VarRLF-Report and if the
RPLMN is included in plmn-IdentityList stored in
VarRLF-Report:
3> include rlf-InfoAvailable;
2> if the UE has logged measurements available for
E-UTRA and if the RPLMN is included in plmn-
IdentityList stored in VarLogMeasReport:
3> include the logMeasAvailable;
2> if the UE has connection establishment failure
information available in VarConnEstFailReport and
if the RPLMN is equal to plmn-Identity stored in
VarConnEstFailReport:
3> include connEstFailInfoAvailable;
1> submit the RRCConnectionReconfigurationComplete
message to lower layers for transmission;
1> if MAC successfully completes the random access
procedure:
2> stop timer T304;
2> apply the parts of the CQI reporting configuration,
the scheduling request configuration and the sound-
ing RS configuration that do not require the UE to
know the SFN of the target PCell, if any;
2> apply the parts of the measurement and the radio
resource configuration that require the UE to know
the SFN of the target PCell (e.g. measurement gaps,
periodic CQI reporting, scheduling request configu-
ration, sounding RS configuration), if any, upon
acquiring the SFN of the target PCell;
NOTE 3: Whenever the UE shall setup or reconfigure a
configuration in accordance with a field that is received
it applies the new configuration, except for the cases
addressed by the above statements.
2> if the UE is configured to provide IDC indications:
3> if the UE has transmitted an InDeviceCoexIndi-
cation message during the last 1 second preceding
reception of the RRCConnectionReconfiguration
message including mobilityControlInfo:
4> initiate transmission of the InDeviceCoexIndi-
cation message in accordance with 5.6.9.3;
2> if the UE is configured to provide power preference
indications:
3> if the UE has transmitted a UEAssistanceInfor-
mation message during the last 1 second preceding
reception of the RRCConnectionReconfiguration
message including mobilityControlInfo:
4> initiate transmission of the UEAssistanceInfor-
mation message in accordance with 5.6.10.3;
2> the procedure ends;
NOTE 4: The UE is not required to determine the SFN of
the target PCell by acquiring system information from
that cell before performing RACH access in the target
PCell.
[ . . . ]
5.3.10.3b SCell Addition/Modification
The UE shall:
1> for each sCellIndex value included in the sCellToAd-
dModList that is not part of the current UE configura-
tion (SCell addition):
2> add the SCell, corresponding to the cellIdentifica-
tion, in accordance with the received radioResource-
ConfigCommonSCell and radioResourceCon-
figDedicatedSCell;
2> configure lower layers to consider the SCell to be in
deactivated state;

1> for each sCellIndex value included in the sCellToAd-
dModList that is part of the current UE configuration
(SCell modification):
2> modify the SCell configuration in accordance with
the received radioResourceConfigDedicatedSCell;
In general, 3GPP R2-130420 discusses protocol architec-
ture alternatives for dual connectivity. Alternative U3 (dis-
cussed in 3GPP R2-130420) is a Centralized PDCP (Packet
Data Convergence Protocol) Termination, while Alternative
U4 (discussed in 3GPP R2-130420) is a Distributed Protocol
Termination for user plane. The pros and cons of alternatives
U3 and U4 described in 3GPP R2-130420 as follows:
3.3 Alternative U3: Centralized PDCP Termination
[ . . . ]
Pros:
 No extra load on EPC in terms of number of connec-
  tions and path switches
Cons:
 Requirements on backhaul between macro and low
  power node
  High capacity
  Medium/Loose latency (PDCP reordering)
 User data need to pass through central point
3.4 Alternative U4: Distributed Protocol Termination
. . .
Pros:
 Supports local breakout at the low power eNB. User
  plane can be optimized towards EPC
 Good support for non-ideal backhaul
  No user data transmission required between macro
   and low power eNBs
 Establishing/removing low power node connectivity
  and PDCP/RLC relocation can be based on Rel-8
  handover procedure with PDCP forwarding.
Cons:
 Extra load on EPC in terms of number of connections
  and path switches
 Possible security implications need further study
Furthermore, in general, 3GPP R2-130570 discusses sce-
narios and benefits of dual connectivity, and addresses
several protocol architecture alternatives for dual connec-
tivity.
In general, the protocol architecture Alternative U3 (Cen-
tralized PDCP Termination) proposed in 3GPP R2-130420
corresponds to the X2 approach discussed in 3GPP
R2-130570; and Alternative U4 (Distributed Protocol Ter-
mination) proposed in 3GPP R2-130420 corresponds to the
S1 approach discussed in 3GPP R2-130570. For Alternative
U4 (Distributed Protocol Termination), it has been proposed
that establishing/removing low power node connectivity
(i.e., the small cell) and PDCP/RLC (Packet Data Conver-
gence Protocol/Radio Link Control) relocation could be
based on Rel-8 handover procedure.
FIG. 5 shows the protocol architecture 500 before small
cell addition. FIG. 6 shows the protocol architecture 600
after small cell addition for the S1 approach (discussed in
3GPP R2-130570), in which two radio bearers (RBs) are
relocated to the small cell.
In general, since RLC entities and PDCP entities of RB2
and RB3 are relocated, the UE would need to re-establish the
RLC entities and PDCP entities of RB2 and RB3 so that (1)
the out-of-sequence AM mode RLC SDUs (Service Data
Units) or the PDCP PDUs (Packet Data Units) reassembled
by the RLC entities could be delivered to the PDCP entities,
and (2) the PDCP status reports for RB2 and RB3 could be
transmitted to the PDCP entities in the small cell eNB for
requesting retransmissions of the missing PDCP PDUs.

A handover procedure will re-establish the RLC entities and PDCP entities of all RBs, and will also reset the MAC (Medium Access Control) entity. However, there is no need to re-establish the RLC entity and PDCP entity of RB1 when the small cell is added. Re-establishing the RLC entity will discard already received RLC PDUs; and re-establishing the PDCP entity will cause transmission of a PDCP status report unnecessarily.

Furthermore, resetting the MAC entity in the macro eNB would force all timeAllignmentTimers to expire. In addition, all HARQ (Hybrid Automatic Repeat Request) buffers for uplink HARQ processes and all soft buffers for downlink HARQ processes would be flushed; PUCCH/SRS (Physical Uplink Control Channel/Sound Reference Symbols) would be released; and configured downlink assignments and uplink grants (i.e., SPS resources) would be cleared. As a result, PUCCH/SRS and SPS resources would need to be reconfigured; and Random Access (RA) procedures should be performed to obtain TA (Time Alignment) values for uplink transmission on the macro cell. All these acts would unnecessarily consume extra radio resources and induce extra latency to the following data transfer. Therefore, it would better not to reset the MAC entity in the UE when a small cell is added. Under the circumstances, the Rel-8 handover procedure is clearly not a radio resource efficient approach for adding or establishing a small cell.

When the small cell is removed, RB2 and RB3 would be relocated back to the macro eNB. The same method discussed above could also be applied to this case.

Figure 7:
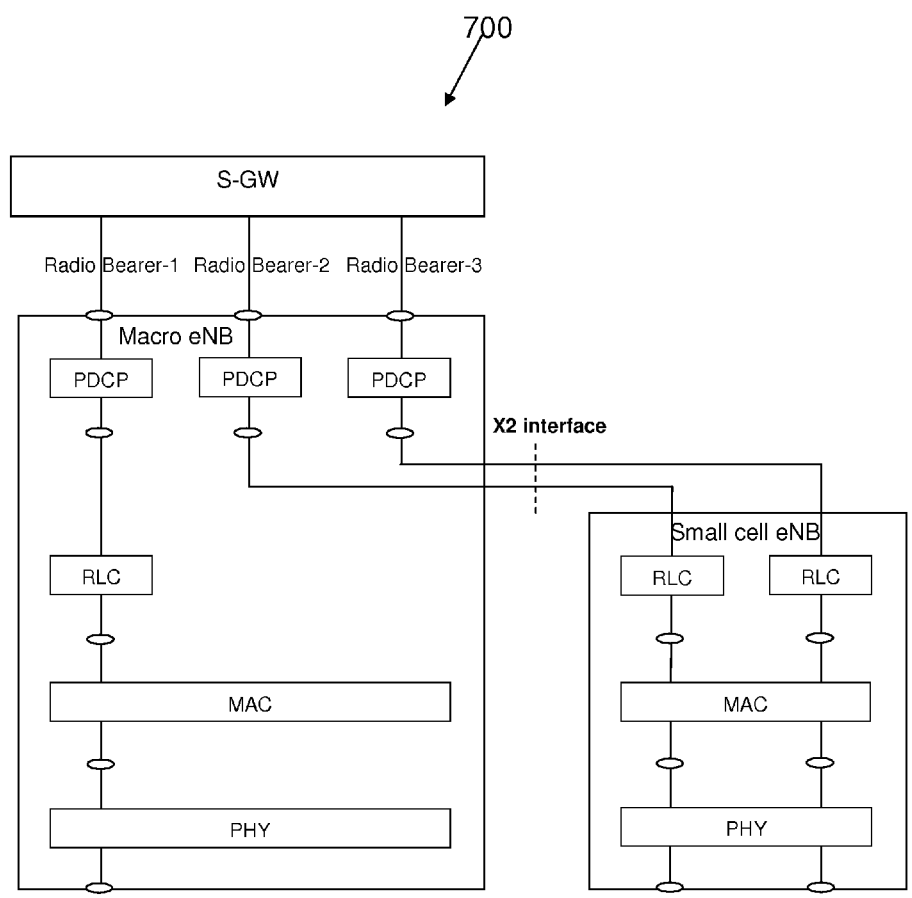
FIG. 7 illustrates another prior art protocol architecture after small cell addition according to one exemplary embodiment.

FIG. 7 shows the protocol architecture after small cell addition for the X2 approach (discussed in 3GPP R2-130570), in which no PDCP relocation occurs. The results would be similar to the S1 approach except that maybe PDCP re-establishment would not be needed.

In the current PDCP specification, a PDCP status report is transmitted by the UE in response to a PDCP re-establishment. Although, PDCP re-establishment is not needed for X2 approach when a small cell is added or removed, it would generally be beneficial for the UE to transmit a PDCP status report to the macro eNB to indicate which PDCP SDUs have been received and which PDCP SDUs need to be retransmitted (e.g., due to missing or header decompression failure), if the PDCP status report is configured as required to the RB.

Figure 8:
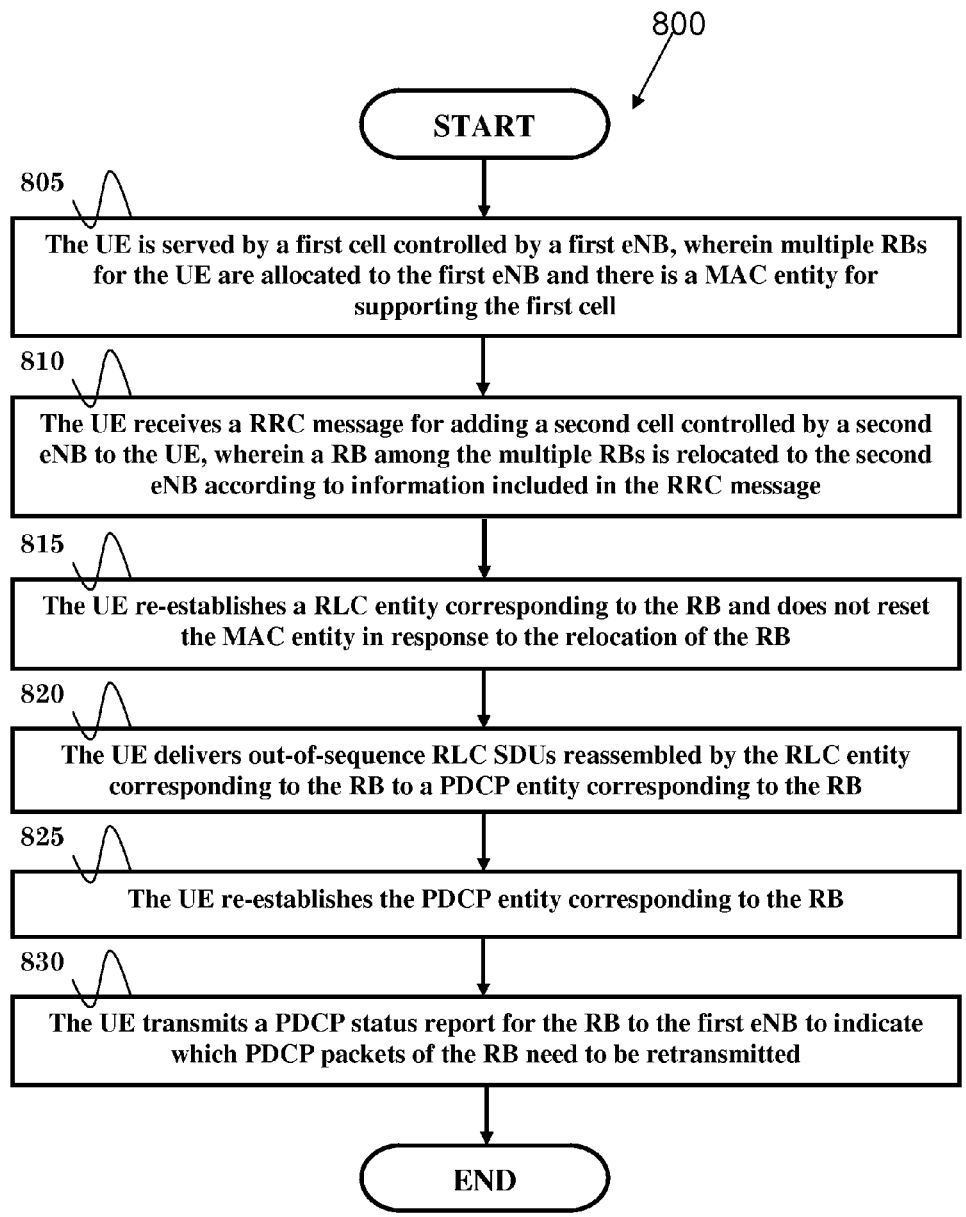
FIG. 8 illustrates a flow chart according to one exemplary embodiment.

FIG. 8 is a flow chart 800 in accordance with one exemplary embodiment. In general, the flow chart 800 illustrates an exemplary method for adding serving cells from the perspective of the UE. In step 805, a UE is served by a first cell controlled by a first eNB, wherein multiple radio bearers (RBs) for the UE are allocated to the first eNB and there is a MAC (Medium Access Control) entity in the UE for supporting the first cell. In step 810, the UE receives a RRC (Radio Resource Control) message for adding a second cell controlled by a second eNB to the UE, wherein a RB among the multiple RBs is relocated to the second eNB according to information included in the RRC message. In step 815, the UE re-establishes a RLC (Radio Link Control) entity corresponding to the RB and does not reset the MAC entity in response to the relocation of the RB.

In one embodiment, as shown in step 820, the UE delivers out-of-sequence RLC SDUs (Service Data Units) reassembled by the RLC entity corresponding to the RB to a PDCP (Packet Data Convergence Protocol) entity corresponding to the RB. In one embodiment, the RLC entity is configured with an AM (Acknowledged Mode). Furthermore, there is a separate MAC entity in the UE for supporting the second cell.

In one embodiment, as shown in step 825, the UE re-establishes the PDCP entity corresponding to the RB. And, in step 830, the UE transmits a PDCP status report for the RB to the first eNB to indicate which PDCP packets of the RB need to be retransmitted.

Referring back to FIGS. 3 and 4, in one embodiment, the device 300 could include a program code 312 stored in memory 310 for adding serving cells in a wireless communication system, wherein a UE is served by a first cell controlled by a first eNB, multiple RBs for the UE are allocated to the first eNB, and an MAC entity is associated with the UE in the first eNB. In one embodiment, the CPU 308 could execute the program code 312 to enable the UE (i) to receive a RRC message for adding a second cell controlled by a second eNB to the UE, wherein a RB among the multiple RBs is relocated to the second eNB according to information included in the RRC message, and (ii) to re-establish a RLC entity corresponding to the RB and does not reset the MAC entity in response to the relocation of the RB.

In one embodiment, the CPU 308 could execute the program code 312 to enable the UE (i) to deliver out-of-sequence RLC SDUs reassembled by the RLC entity corresponding to the RB to a PDCP entity corresponding to the RB, (ii) to re-establish the PDCP entity corresponding to the RB, and/or (iii) to transmit a PDCP status report for the RB to the first eNB to indicate which PDCP packets of the RB need to be retransmitted. In addition, the CPU 308 could execute the program code 312 to perform all of the above-described actions and steps or others described herein.

Figure 9:
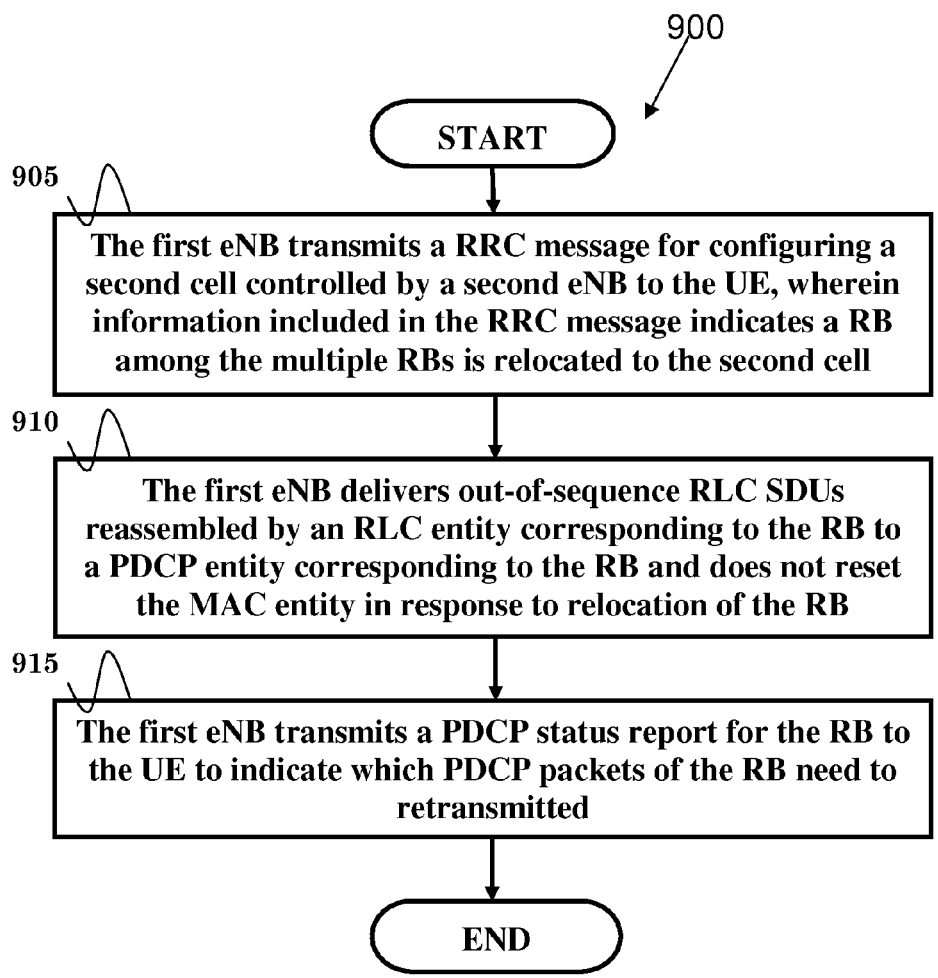
FIG. 9 illustrates a flow chart according to one exemplary embodiment.

FIG. 9 is a flow chart 900 in accordance with one exemplary embodiment. In general, the flow chart 900 illustrates an exemplary method for adding serving cells from the perspective of a first eNB in a scenario wherein a UE is served by a first cell controlled by the first eNB, multiple radio bearers RBs for the UE are allocated to the first eNB, and a MAC entity is associated with the UE in the first eNB. In step 905, the first eNB transmits a RRC message for configuring a second cell controlled by a second eNB to the UE, wherein information included in the RRC message indicates a RB among the multiple RBs is relocated to the second cell. In step 910, the first eNB delivers out-of-sequence RLC SDUs reassembled by a RLC entity corresponding to the RB to a PDCP entity corresponding to the RB and does not reset the MAC entity in response to relocation of the RB. Also, in step 915, the first eNB transmits a PDCP status report for the RB to the UE to indicate which PDCP packets of the RB need to be retransmitted. In one embodiment, the RLC entity corresponding to the RB is relocated from the first eNB to the second eNB. Furthermore, the RLC entity could be configured with an AM (Acknowledged Mode).

In one embodiment, the PDCP entity corresponding to the RB could be relocated from the first eNB to the second eNB. Furthermore, the PDCP entity corresponding to the RB could be located in the first eNB before and after the second cell is added.

Referring back to FIGS. 3 and 4, in one embodiment, the device 300 could include a program code 312 stored in memory 310 for adding serving cells in a wireless communication system, wherein a UE is served by a first cell controlled by a first eNB, multiple RBs for the UE are allocated to the first eNB, and an MAC entity is associated with the UE in the first eNB. In one embodiment, the CPU 308 could execute the program code 312 to enable the first eNB (i) to transmit a RRC message for configuring a second cell controlled by a second eNB to the UE, wherein information included in the RRC message indicates a RB among the multiple RBs is relocated to the second cell, and (ii) to deliver out-of-sequence RLC SDUs reassembled by a RLC entity corresponding to the RB to a PDCP entity corresponding to the RB and does not reset the MAC entity in response to relocation of the RB. In one embodiment, the CPU 308 could execute the program code 312 to enable the first eNB to transmit a PDCP status report for the RB to the UE to indicate which PDCP packets of the RB need to be retransmitted. In addition, the CPU 308 could execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for adding serving cells in a wireless communication system, comprising:
   a UE (User Equipment) is served by a first cell controlled by a first eNB (evolved Node B), wherein multiple radio bearers (RBs) for the UE are allocated to the first eNB and there is a MAC (Medium Access Control) entity in the UE for supporting the first cell;

the UE receives a RRC (Radio Resource Control) message for adding a second cell controlled by a second eNB to serve the UE together with the first cell, wherein a RB among the multiple RBs is relocated to the second eNB according to information included in the RRC message; and in response to the relocation of the RB, the UE re-establishes a RLC (Radio Link Control) entity corresponding to the RB, does not re-establish RLC entities corresponding to RBs which are not relocated to the second eNB, and does not reset the MAC entity.

2. The method of claim 1, further comprising:
the UE delivers out-of-sequence RLC SDUs (Service Data Units) reassembled by the RLC entity corresponding to the RB to a PDCP (Packet Data Convergence Protocol) entity corresponding to the RB.

3. The method of claim 2, wherein the UE re-establishes the PDCP entity corresponding to the RB.

4. The method of claim 1, wherein there is a separate MAC entity in the UE for supporting the second cell.

5. The method of claim 1, wherein the RLC entity is configured with an AM (Acknowledged Mode).

6. The method of claim 1, further comprising:
the UE transmits a PDCP status report for the RB to the first eNB to indicate which PDCP packets of the RB need to be retransmitted.

7. A communication device for adding serving cells in a wireless communication system, wherein a UE (User Equipment) is served by a first cell controlled by a first eNB (evolved Node B), multiple radio bearers (RBs) for the UE are allocated to the first eNB, and a MAC (Medium Access Control) entity is associated with the UE in the first eNB, the communication device comprising:
a control circuit;
a processor installed in the control circuit;
a memory installed in the control circuit and operatively coupled to the processor;

wherein the processor is configured to execute a program code stored in memory to enable the UE to:
receive a RRC (Radio Resource Control) message for adding a second cell controlled by a second eNB to serve the UE with the first cell, wherein a RB among the multiple RBs is relocated to the second eNB according to information included in the RRC message; and
in response to the relocation of the RB, re-establish a RLC (Radio Link Control) entity corresponding to the RB, does not re-establish RLC entities corresponding to RBs which are not relocated to the second eNB, and does not reset the MAC entity.

8. The communication device of claim 7, wherein the processor is further configured to execute a program code stored in memory to enable the UE to deliver out-of-sequence RLC SDUs (Service Data Units) reassembled by the RLC entity corresponding to the RB to a PDCP (Packet Data Convergence Protocol) entity corresponding to the RB.

9. The communication device of claim 8, wherein the processor is further configured to execute a program code stored in memory to enable the UE to re-establish the PDCP entity corresponding to the RB.

10. The communication device of claim 7, wherein there is a separate MAC entity in the UE for supporting the second cell.

11. The communication device of claim 7, wherein the RLC entity is configured with an AM (Acknowledged Mode).

12. The communication device of claim 7, wherein the processor is further configured to execute a program code stored in memory to enable the UE to transmit a PDCP status report for the RB to the first eNB to indicate which PDCP packets of the RB need to be retransmitted.

* * * * *